Figure 4:
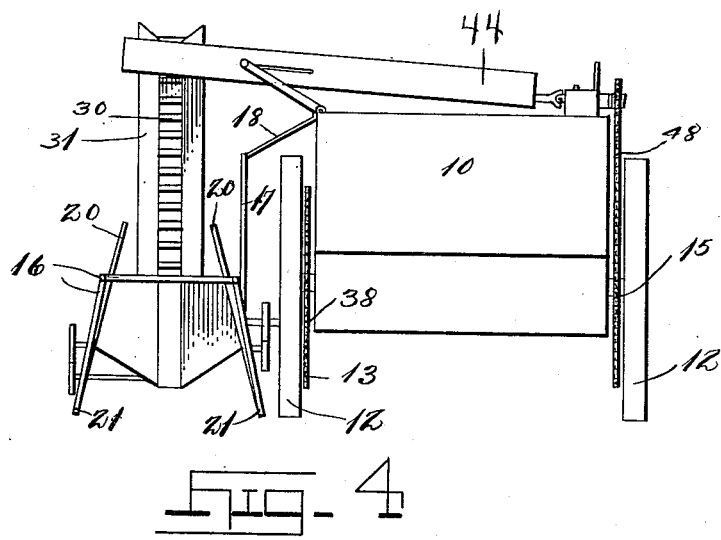

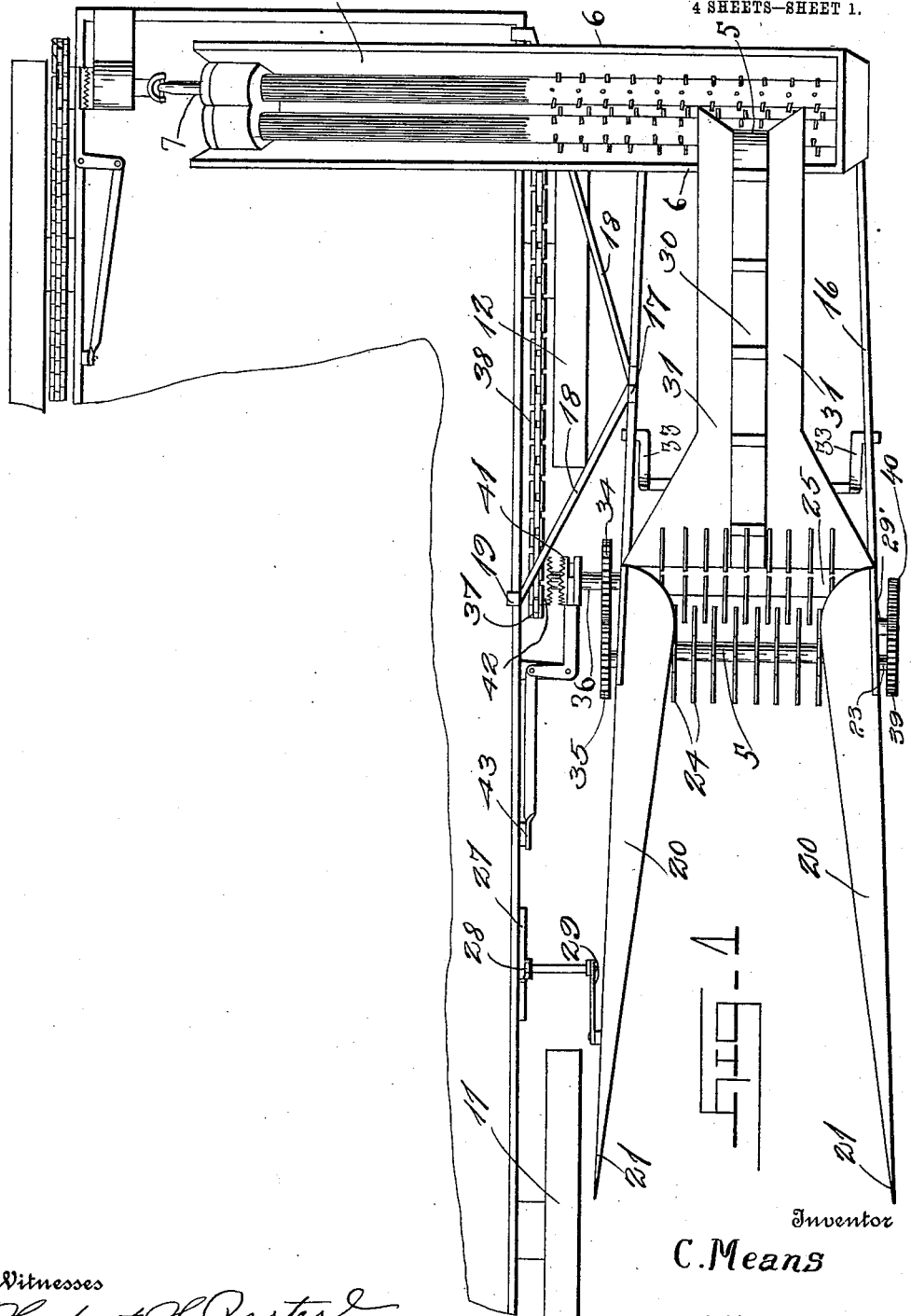

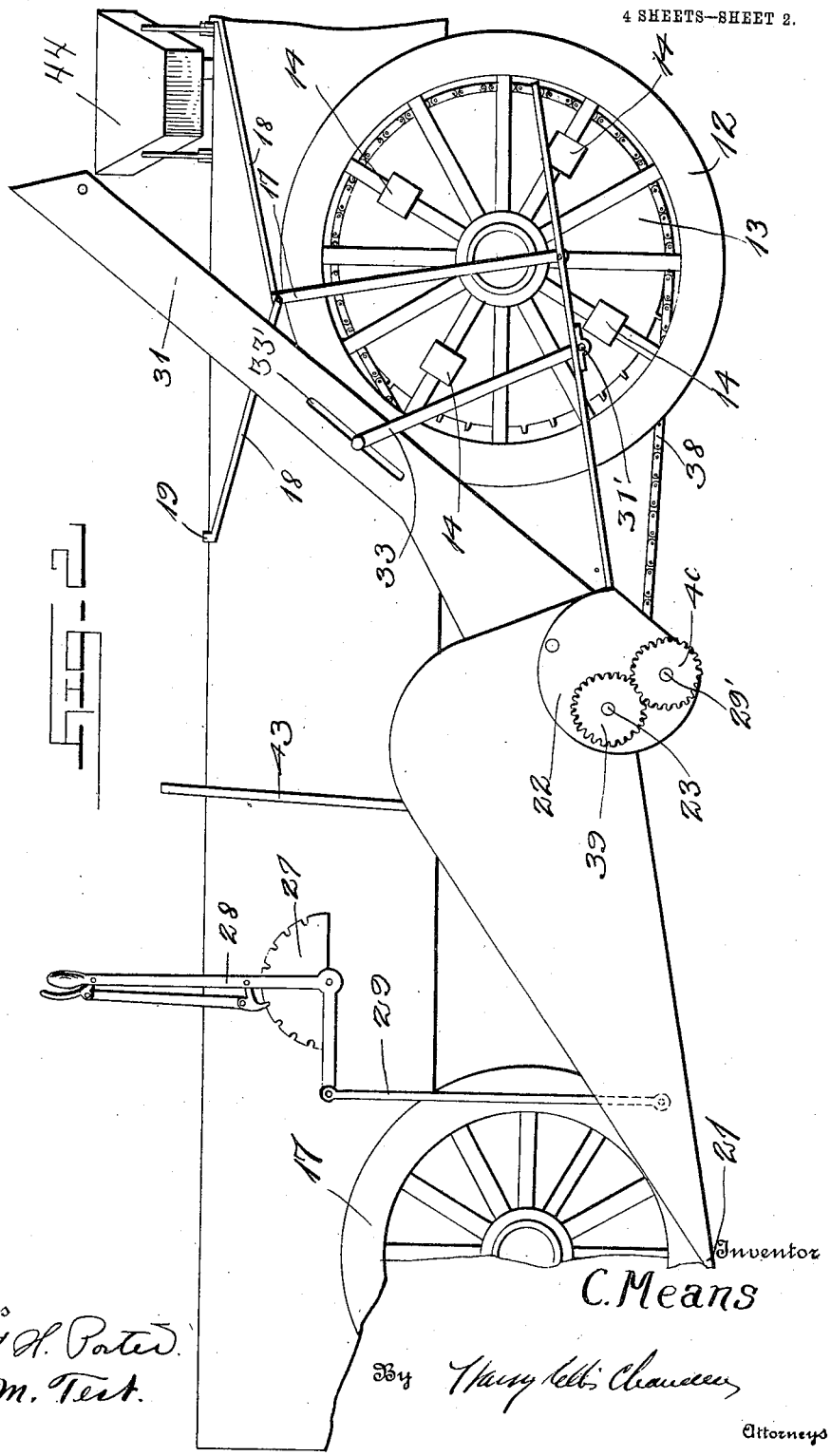

C. MEANS.
CORN HARVESTER.
APPLICATION FILED JAN. 24, 1912.
1,087,455.
Patented Feb. 17, 1914.
4 SHEETS—SHEET 3.
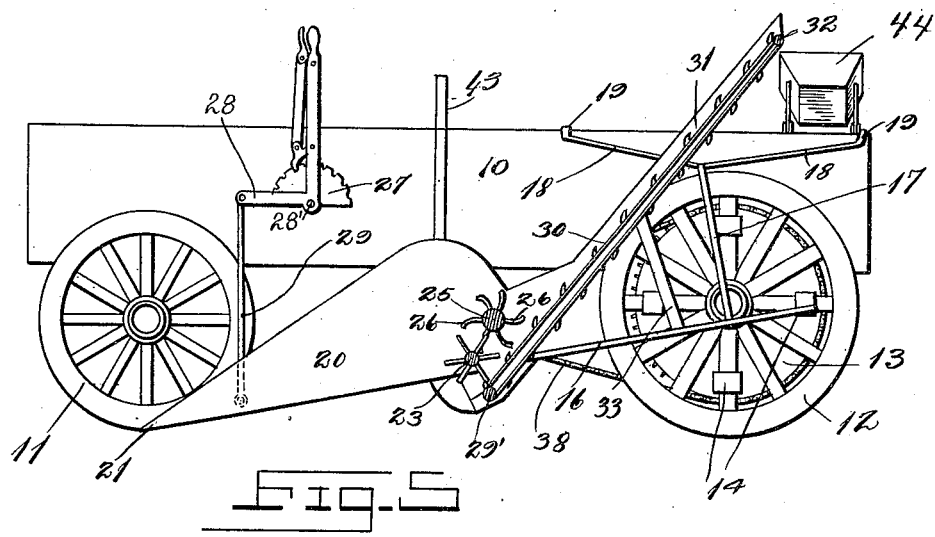
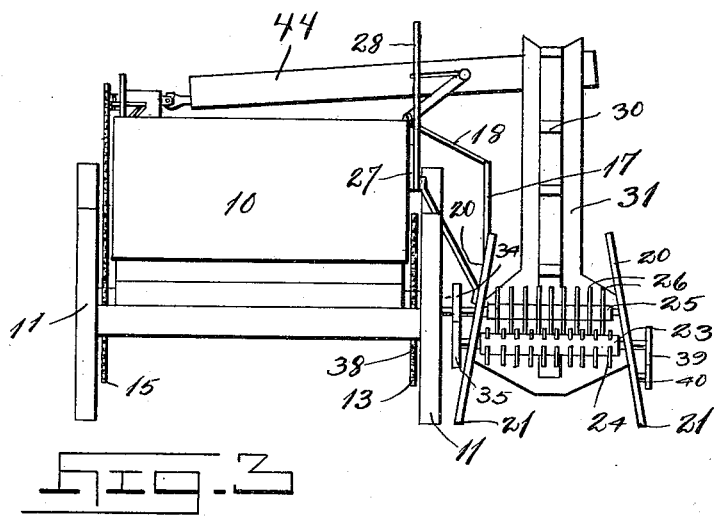

C. MEANS.
CORN HARVESTER.
APPLICATION FILED JAN. 24, 1912.

1,087,455.

Patented Feb. 17, 1914.
4 SHEETS—SHEET 4.

Witnesses
Herbert H. Porter
Harry M. Test

Inventor
C. Means

By

Attorneys

UNITED STATES PATENT OFFICE.

CLAUDE MEANS, OF HARRIS, KANSAS.

CORN-HARVESTER.

1,087,455.  Specification of Letters Patent. Patented Feb. 17, 1914.

Application filed January 24, 1912. Serial No. 673,192.

*To all whom it may concern:*

Be it known that I, CLAUDE MEANS, a citizen of the United States, residing at Harris, in the county of Anderson and State of Kansas, have invented certain new and useful Improvements in Corn-Harvesters, of which the following is a specification.

This invention relates to improvements in corn harvesters, and has particular reference to a device for stripping the ears from the stalk, and elevating them to a husking device.

The principal object of the invention is to provide a simple device of this character which may be readily attached to and driven by the ordinary farm wagon, the ears being stripped from the stalk along side of the wagon, and elevated to a husker.
Other objects and advantages will be apparent from the following description and with particular reference to the accompanying drawings.

In the drawings: Figure 1 is a plan view of the device, Fig. 2 is a side elevation, Fig. 3 is a front elevation, Fig. 4 is a rear elevation, Fig. 5 is a vertical longitudinal sectional view on the line 5—5 of Fig. 1.

Referring particularly to the drawings, 10 represents the body of a farm wagon supported by the front wheels 11 and rear wheels 12. Secured to the rear wheels 12 by the clamps 14, are the driving sprockets 13 and 15, from which power is derived to drive the mechanism of my corn gatherer and husker.

Arranged on one side of the wagon, and below the body is a longitudinally disposed frame 16, to the rear end of which is secured an upwardly extending bar 17. Connected to the upper end of the bar 17 are the upwardly and outwardly extending arms 18, each of which is provided with a terminal hook 19 for engagement with the upper edge of the wagon body. The frame 16 extends on a downward incline to a point midway of the length of the wagon toward the front thereof, and to the forward end of the frame are secured the upwardly extending side plates 20 forming the part of the gathering and stripping mechanism. Each of the plates 20 tapers to a point 21 at its forward end, said points being so disposed and spaced apart as to straddle a row of standing corn, the stalks of corn being received therebetween.

Mounted in the forward end of the frame 16, and between the rear ends of the plates 20 are the bearing blocks 22 in which is journaled a stripping roller 23, said roller having a series of radially extending pins 24, for engagement with the standing stalks of corn to strip the ears therefrom. Also journaled in the bearings 22, slightly above and to the rear of the said roller is a beating roller 25 having the series of radially extending curved beater fingers 26 for passing the ears to the elevator to be later described.

Just above the plates 20 and mounted on the side of the wagon is a segmental rack 27, having an angle lever 28, mounted on the pivot 28', connected to one of the plates 20 by means of the link 29, whereby the frame 16 may be swung upwardly or downwardly according to the height of the corn.

Journaled in the bearing plates 22 below the stripping roller is a roller 29' over which passes the elevator belt 30. A frame 31 is secured at its lower end to the frame 16, and extends upwardly and rearwardly to a suitable point above the wagon body, said frame having another roller 32 journaled in its upper end, over which also passes the belt 30. The lower portion of the belt travels beneath the stripping roller, so that the ears that are stripped from the stalks are dropped directly on to the elevator belt, and carried upwardly over the wagon box. Between the frames 16 and 31 are suitable braces 33, for supporting the said frame 31 in its inclined position, these braces being pivoted at 31' to the frame 16, and slidable in the slots 33' of the frame 31. On the inner end of the shaft of the roller 25 is a gear 34, which meshes with a similar gear 35 on the inner end of the shaft of the roller 23 thus driving the stripper and beater rollers in unison. The inner end of the shaft of the roller 25 has an extension 36 on which is mounted a sprocket wheel 37, a suitable drive chain 38 passing over the large sprocket wheel 13 and the said sprocket 37, whereby the beater and stripping rollers are driven as the wagon moves forward. On the outer end of the shaft of the roller 23 is a pinion 39, which meshes with a similar pinion 40 on the relative end of the shaft of the roller 29'. Thus motion is communicated from the rear wheel of the wagon to the stripping and beater mechanisms and the elevator.

Keyed on the extension 36 is a slidable clutch member 41 for engagement with loosely mounted clutch member 42 which is rigidly attached to the sprocket 37, whereby the gathering mechanism may be thrown into and out of gear, a suitable lever 43 is disposed within easy reach for accomplishing the movement of the clutch member.

On the rear of the wagon box is mounted my husking device 44.

The rod or bar 17 is pivotally connected to the rear end of the frame 16, so that when the lever 28 is moved the frame 16 will swing on this pivot.

From the foregoing it will readily be seen that the device is extremely simple in construction and operation, and may be readily attached to or detached from the ordinary farm wagon.

What is claimed is:

A corn harvesting attachment for a farm wagon, comprising an adjustable supporting frame, an elevator adjustably mounted on the frame, a pair of intergeared rollers carried in the lower end of the elevator frame, stripping elements on one of the rollers, beater elements carried by the other of the rollers, means for driving the rollers, a gathering means carried by the lower end of the elevator, and extending forwardly of the stripping and beating means, and means for raising and lowering the gathering means and elevator simultaneously.

In testimony whereof I affix my signature, in the presence of two witnesses.

CLAUDE MEANS.

Witnesses:
H. C. REPPERT,
G. W. TRALL.

---

Copies of this patent may be obtained for five cents each, by addressing the "Commissioner of Patents, Washington, D. C."